US00RE43921E

(19) United States
(12) Reissued Patent
Smed

(10) Patent Number: US RE43,921 E
(45) Date of Reissued Patent: Jan. 15, 2013

(54) FLAT PANEL DISPLAY SYSTEM

(75) Inventor: Ole F. Smed, Calgary (CA)

(73) Assignee: Trade Management Group Limited, Denver, CO (US)

(21) Appl. No.: 12/187,411

(22) Filed: Aug. 7, 2008

Related U.S. Patent Documents

Reissue of:
(64) Patent No.: 6,695,270
Issued: Feb. 24, 2004
Appl. No.: 10/222,138
Filed: Aug. 15, 2002

(51) Int. Cl.
*E04G 3/00* (2006.01)

(52) U.S. Cl. ..... 248/274.1; 248/124.1; 248/276.1; 248/278.1; 248/282.1; 248/917

(58) Field of Classification Search ..... 248/274.1, 248/276.1, 278.1, 282.1, 284.1, 288.31, 289.11, 248/291.1, 176.1, 125.7, 125.9, 917–923; 361/681–683, 679.01; 403/117, 119, 164; 362/427, 430
See application file for complete search history.

(56) References Cited

U.S. PATENT DOCUMENTS

| | | | | | |
|---|---|---|---|---|---|
| 1,002,783 | A | | 9/1911 | Sweet | 248/282.1 |
| 4,082,244 | A | | 4/1978 | Groff | 248/280.11 |
| 4,166,602 | A | | 9/1979 | Nilsen et al. | 248/280.11 |
| 4,687,167 | A | * | 8/1987 | Skalka et al. | 248/126 |
| 4,726,552 | A | | 2/1988 | Warshawsky | 248/122.1 |
| 4,836,486 | A | | 6/1989 | Vossoughi et al. | 248/281.11 |
| 4,844,387 | A | * | 7/1989 | Sorgi et al. | 108/5 |
| 5,342,137 | A | | 8/1994 | Peng | 403/164 |
| 5,379,205 | A | | 1/1995 | Peng | 362/430 |
| 5,687,939 | A | * | 11/1997 | Moscovitch | 248/122.1 |
| 5,820,287 | A | | 10/1998 | Bartlett et al. | |
| 5,842,672 | A | | 12/1998 | Sweere et al. | |
| 6,076,785 | A | | 6/2000 | Oddsen, Jr. | 248/118.3 |
| 6,283,428 | B1 | | 9/2001 | Maples et al. | 248/282.1 |
| 6,409,134 | B1 | | 6/2002 | Oddsen, Jr. | 248/274.1 |
| 6,478,274 | B1 | * | 11/2002 | Oddsen, Jr. | 248/274.1 |
| 6,554,238 | B1 | | 4/2003 | Hibberd | 248/278.1 |
| 6,758,454 | B2 | * | 7/2004 | Smed | 248/278.1 |
| 6,863,252 | B2 | * | 3/2005 | Bosson | 248/278.1 |
| 6,935,883 | B2 | * | 8/2005 | Oddsen, Jr. | 439/374 |
| 7,246,780 | B2 | * | 7/2007 | Oddsen, Jr. | 248/282.1 |
| 7,387,286 | B2 | * | 6/2008 | Dittmer et al. | 248/278.1 |
| 7,395,995 | B2 | * | 7/2008 | Chen | 248/284.1 |
| 2001/0045497 | A1 | | 11/2001 | Coonan et al. | |
| 2002/0011544 | A1 | | 1/2002 | Bosson | |

(Continued)

OTHER PUBLICATIONS

United States District Court For The District of SC, Charleston Division, *Trade Management Group, Limited* v *Innovative Office Products, Inc.*, Civil Action No. 2:08-CV-1057-MBS, documents INN-001 through INN-005.

(Continued)

*Primary Examiner* — Tan Le
(74) *Attorney, Agent, or Firm* — Joseph T. Guy; Nexsen Pruet, LLC

(57) ABSTRACT

A modular display system for display devices, especially flat screen monitors which is a hub and spoke design whereby multiple monitors are mounted at the same hub height. The display system has means for locking the height of each display device using a cam and brake concept adjusted using a jackscrew. For quick change-out of display devices, a bayonet mount is used to attach the display device to the spokes.

8 Claims, 12 Drawing Sheets

AMENDED

U.S. PATENT DOCUMENTS

2012/0025037 A1* 2/2012 Chang ..... 248/124.1

OTHER PUBLICATIONS

U.S. patent application Publication No. US 2002/0011544 A1 Pub. Date: Jan. 31, 2002 Bosson/ Display Device Support System.

U.S. patent application Publication No. US 2001/0045497 A1 Pub. Date: Nov. 29, 2001 Coonan et al. / Vertically Adjustable Mobile Computer Workstation.

* cited by examiner

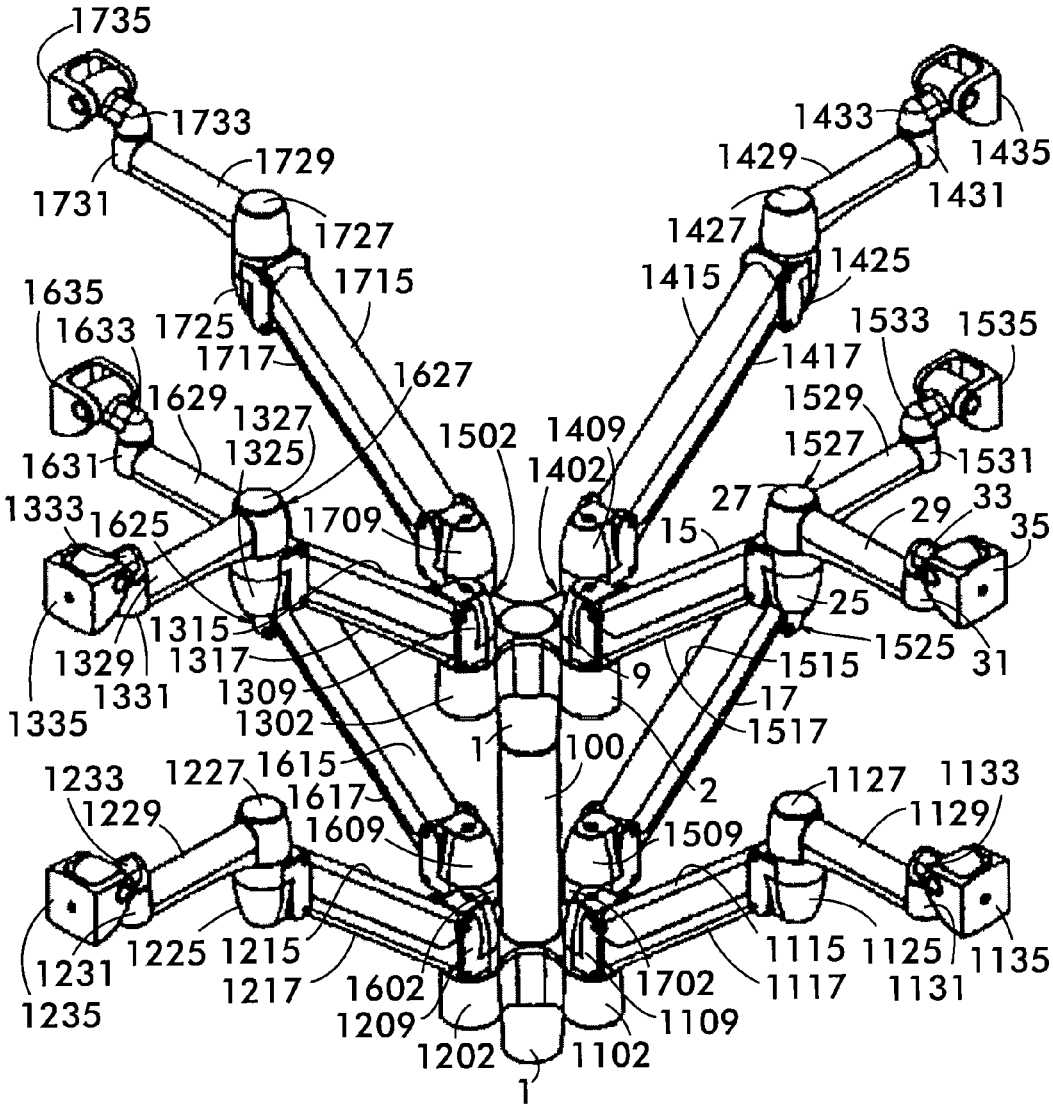
FIG 4
AMENDED

FLAT PANEL DISPLAY SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to systems for supporting one or more display panels. More particularly, the support system provides a means for supporting multiple displays such as flat screen liquid crystal display devices and enables their adjustment so as to maintain the screens in a common visual plane. The invention particularly relates to a modular hub and spoke system which provides easy alignment, greater range of adjustment, and which has, therefore, multiple uses.

2. Background and Prior Art

Computerized workstations can provide very large amounts of information provided that there is adequate display surface area. Banks of cathode ray tube monitors characterize a variety of work stations, including industrial control rooms, television broadcast studios and securities brokerages. The evolution of flat screen liquid crystal displays (LCD) has greatly reduced the size of monitors as well as decreased their weight and heat loading. The improved flexibility available for work station design requires methods for mounting multiple flat screens so that they are equally readable from the same viewing location (i.e. in the same focal plane) and adjustable for different users. U.S. Patent publication 2002/0011544A1 discloses a quick-release system for replacing failed display monitors. U.S. Patent publication 2001/0045497A1 discloses an adjustable computer work station using multiple arms to raise and lower and adjust the angle of a display screen and a keyboard. U.S. Pat. No. 5,842,672 discloses a multi-jointed and pivoted support system for a flat panel video display. U.S. Pat. No. 5,820,287 discloses an articulated conduit joint involving two arms and a clutched joint to maintain adjusted location.

Systems for mounting multiple LCD panels heretofore have mounted panels on a separate support, have ganged panels on a common support bar or brace or have articulated each panel from a different point on a horizontal or vertical support. The result is that there is either limited range of movement for adjusting each panel or that each panel has a different range of motion.

BRIEF DESCRIPTION OF THE INVENTION

It is an object of this invention to provide a system for supporting displaying devices, especially flat screen LCD monitors which provides equivalent ranges of motion for each set of screens. It is a further objective of this invention to provide a system for supporting flat screen LCD monitors, which can be aligned to provide substantially equivalent focal points or focal planes. It is a further object of this invention to provide a modular mounting system which is adaptable to multiple screens using a single mounting system and a single mounting point on a desk or other support structure.

BRIEF DESCRIPTION OF THE DRAWINGS

FIG. 4 is a stacked quad assembly arrangement.

DETAILED DESCRIPTION OF THE INVENTION

Figure 1:
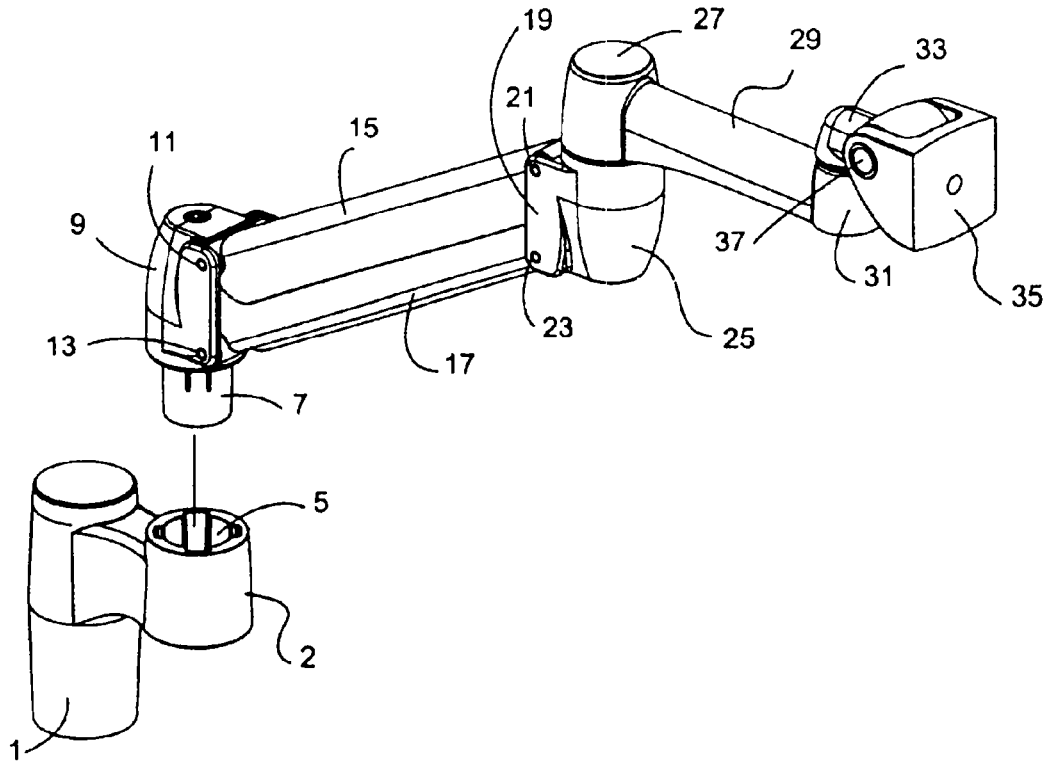
FIG. 1 is a partial sectional view of a hub and a single spoke.

The invention is a hub and spoke design for a mounting system to display one or more display devices, especially flat screen LCD monitors. More particularly, the invention enables the display of multiple monitors in a collage format for rapid viewing of multiple sets of information. The invention is characterized by being quickly adjustable but subsequently easily locked into position. In additional, repairs may be made quickly by rapid change-out of screens. The invention will describe in terms of the illustrated embodiments shown in the drawings.

FIG. 1 shows a partial sectional view of the components of this invention. Hub 1, which for illustrative purposes is shown as a vertical tube, which is firmly mounted at one end (the base, not shown) to a desk, table, wall, furniture panel or accessory hanging system, supports a socket assembly arm 2. The socket or bore 5 receives a pivot post 7 which carries a swivel turret 9 with hinging means such as hinge pins 11 and 13. A radius arm 15 and a control arm 17 are carried on the hinge pins and connect to a second hinge bracket 19 with respective hinge pins 21 and 23 to form a parallelogram. A gas or coil steel spring (not shown because it is internal to arm 15) connects swivel turret to the arm 15 to stabilize the position of bracket 19. Bracket 19 carries a connector 25 which is illustrated as a post-type connector. Internal to 25 is a brake system shown in FIG. 5. A swivel turret 27 attaches to the post and has a fixed length arm 29 extending therefrom. The arm terminates in a swivel or socket 31 to which a short swivel arm 33 is rotatably attached. The swivel arm is parallel to said fixed length arm 29. The swivel arm terminates in a mounting bracket 35 which is adjustable about hinge pin 37. The screen is attached to bracket 35 using a system shown in FIGS. 10-12.

Figure 2:
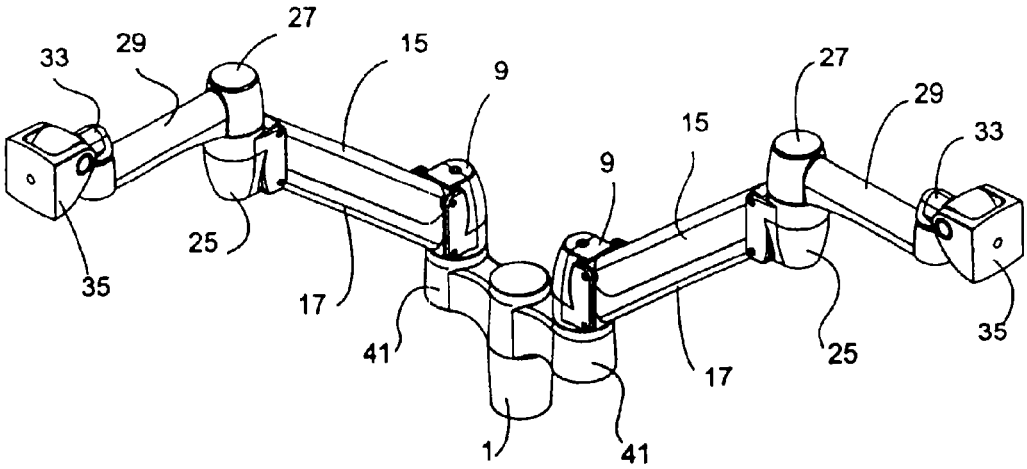
FIG. 2 is an assembled duplex mounting system.

FIG. 2 shows a duplex mounting arrangement wherein socket assembly arm 2 has been replaced with a duplex assembly 41 which carries two sockets and supports two arms, each articulated assembly being carried at the same level on the hub 1.

Figure 3:
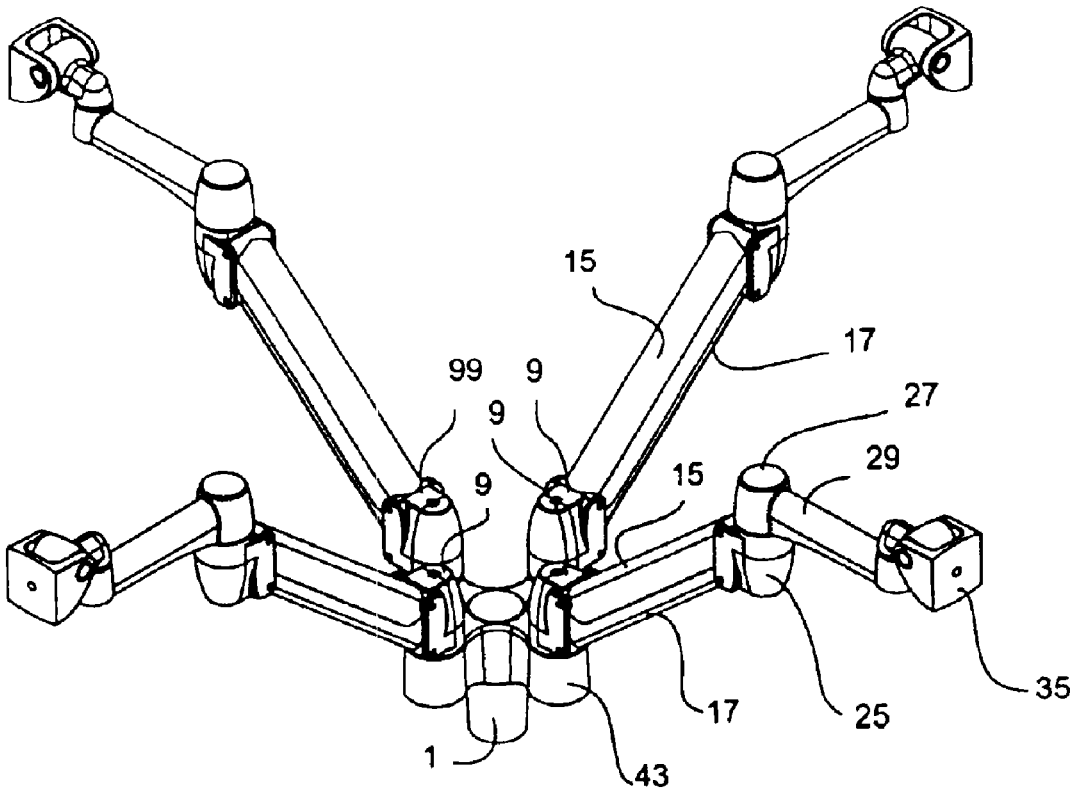
FIG. 3 is an assembled quad assembly arrangement.

FIG. 3 shows a quad socket assembly wherein a section 43 having four sockets is attached to the hub 1, the numbers for each element being those described supra.

FIG. 4 shows an assembly having two quad sockets mounted on the same hub structure. Again, the numbers for each element are those described supra. *In FIG. 4 an upper and lower socket assembly are connected by a connector, 100, between a first hub and an second hub. In FIG. 4 each socket; 2, 1102, 1202, 1302, 1402, 1502, 1602 and 1702; has a first turret; 9, 1109, 1209, 1309, 1409, 1509, 1609, and 1709;*

*attached thereto. Each first turret has a radius arm; 15, 1115, 1215, 1315, 1415, 1515, 1615 and 1715; and a control arm; 17, 1117, 1217, 1317, 1417, 1517, 1617 and 1717; attached thereto. A connector; 25, 1125, 1225, 1325, 1425, 1525, 1625 and 1725; is attached to each radius arm and control arm opposite the first turret. A second turret; 27, 1127, 1227, 1327, 1427, 1527, 1627 and 1727; is attached to each connector. A fixed length arm; 29, 1129, 1229, 1329, 1429, 1529, 1629 and 1729; is attached to each second turret. A second socket; 31, 1131, 1231, 1331, 1431, 1531, 1631 and 1731; is attached to each fixed length arm. A swivel arm; 33, 1133, 1233, 1333, 1433, 1533, 1633 and 1733; is attached to each second socket. A bracket; 35, 1135, 1235, 1335, 1435, 1535, 1635 and 1735; is attached to each swivel arm.*

Although the invention has been illustrated in terms of a tubular hub, square tubing or channel sections are equally usable. Likewise, a horizontal brace could be used for the hub and the sockets turned 90° compared to that illustrated in FIGS. 1 through 4.

Critical to the operation of the system is the ability to locate each screen in a desired position and to hold the screen in that position. It is conventional to counterbalance flat screen monitors and other devices which are adjustable vertically using parallel arms hinged at their ends and to suspend them using coiled or gas springs. The force exerted by the spring induces a lifting force on the parallelogram arm which is changed by altering the angle of the spring. It therefore follows, detachment of the screen from the arm would cause a change in height setting. When multiple screens are placed in close proximity, as in trading and monitoring stations, and a quick change of screen is required, it is desirable the height setting of the screen mount remain constant. For this reason we have devised a method to lock each screen at the desired height setting.

Figure 5:
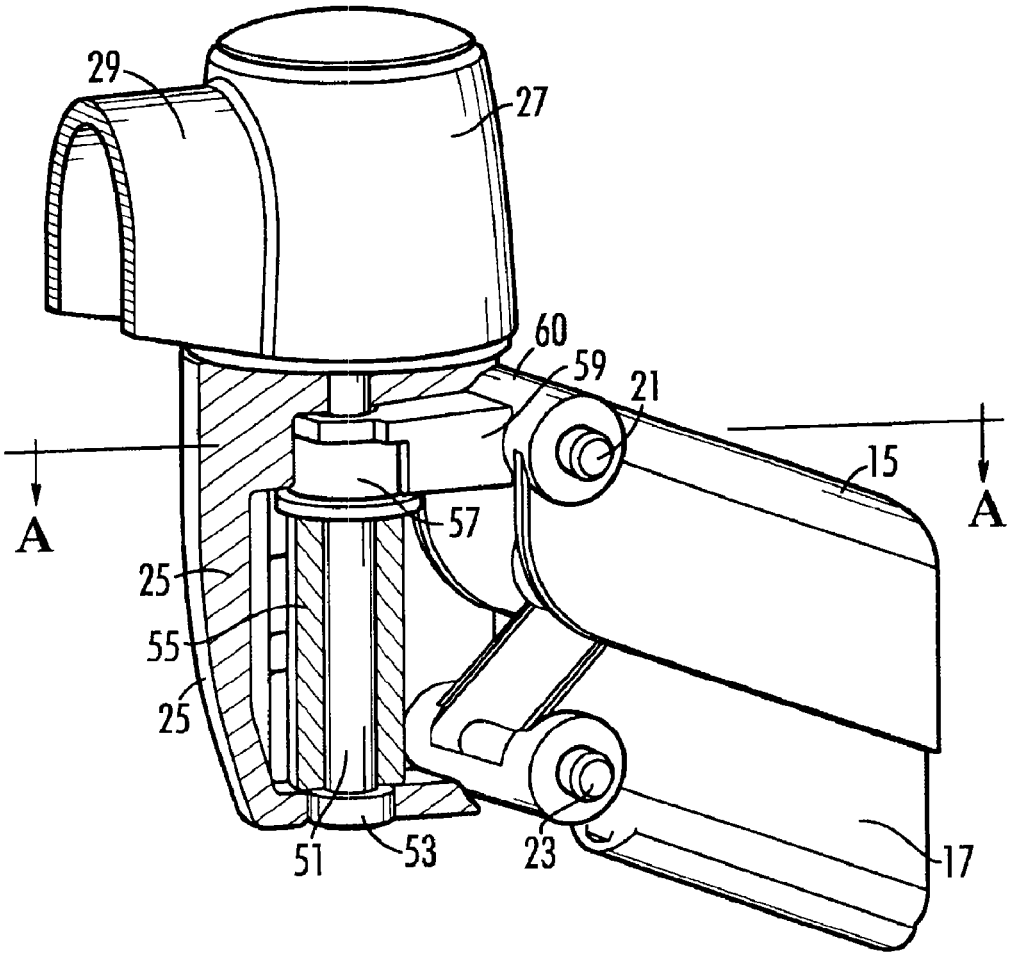
FIG. 5 is a cut-away showing the brake assembly for locking the height

FIG. 5 shows the locking mechanism in a cut-away. Radius arm 15 and control arm 17 are the long parallel arms of the parallelogram. The bracket 19 and connector housing 25 have been partially cut away to reveal the location of hinge pins 21, 23. A jackscrew 51 is retained by an unthreaded spacer sleeve 55. At the top of the jackscrew is carried a cam 57 which is thread locked onto screw 51. The lock of the cam presses against a brake shoe 59 forcing it into axle housing 60 molded into the end of arm 17.

Figure 6:
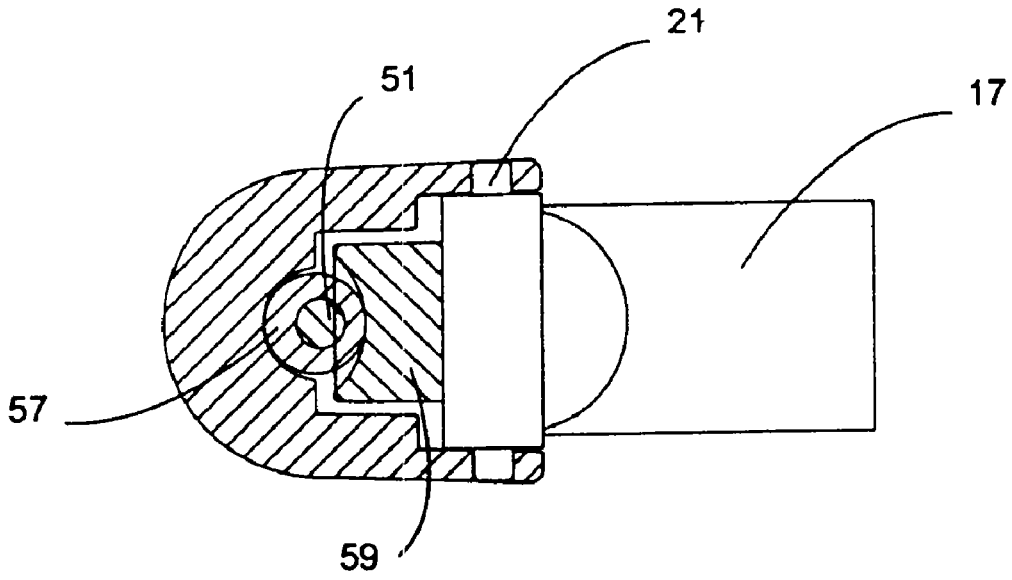
FIG. 6 is a section of FIG. 5 along line A-A.

FIG. 6 shows the relationship of the components along A-A.

Figure 7A:
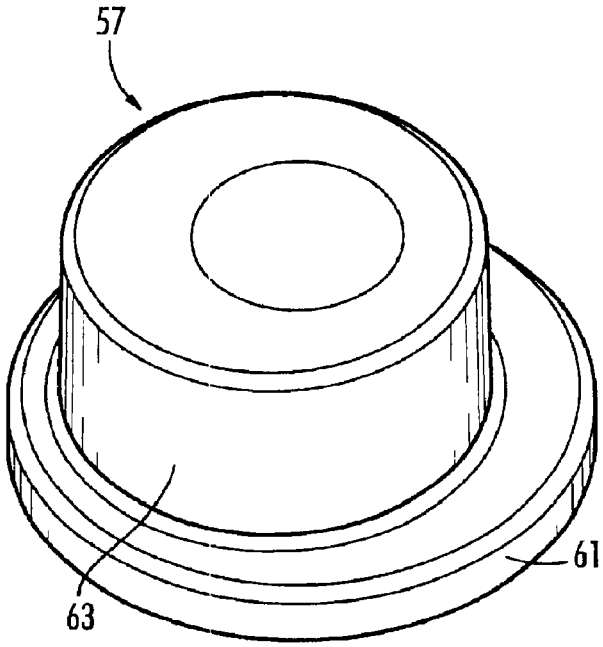
FIGS. 7A and 7B are a plan and elevational view, respectively, of the brake cam of the locking device.
Figure 7B:
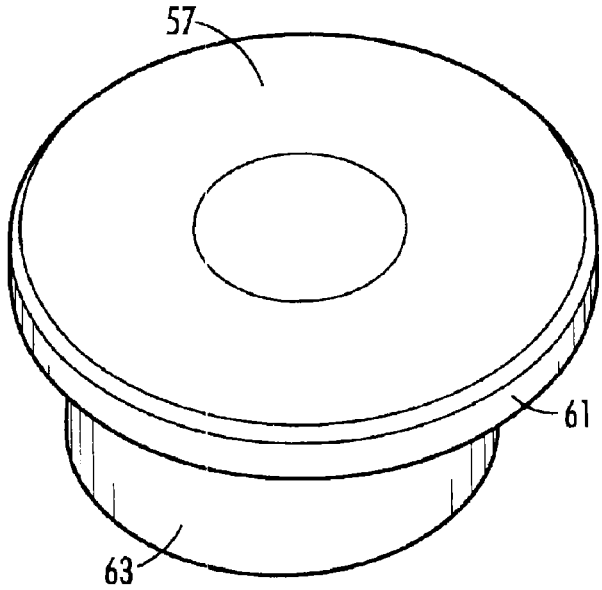

FIG. 7A is a plan view of cam 57. A circular base rests on the sleeve 61. An eccentric lock 63 projects upwardly, as shown in side elevation FIG. 7B. The lock contacts the brake shoe 59.

Figure 8:
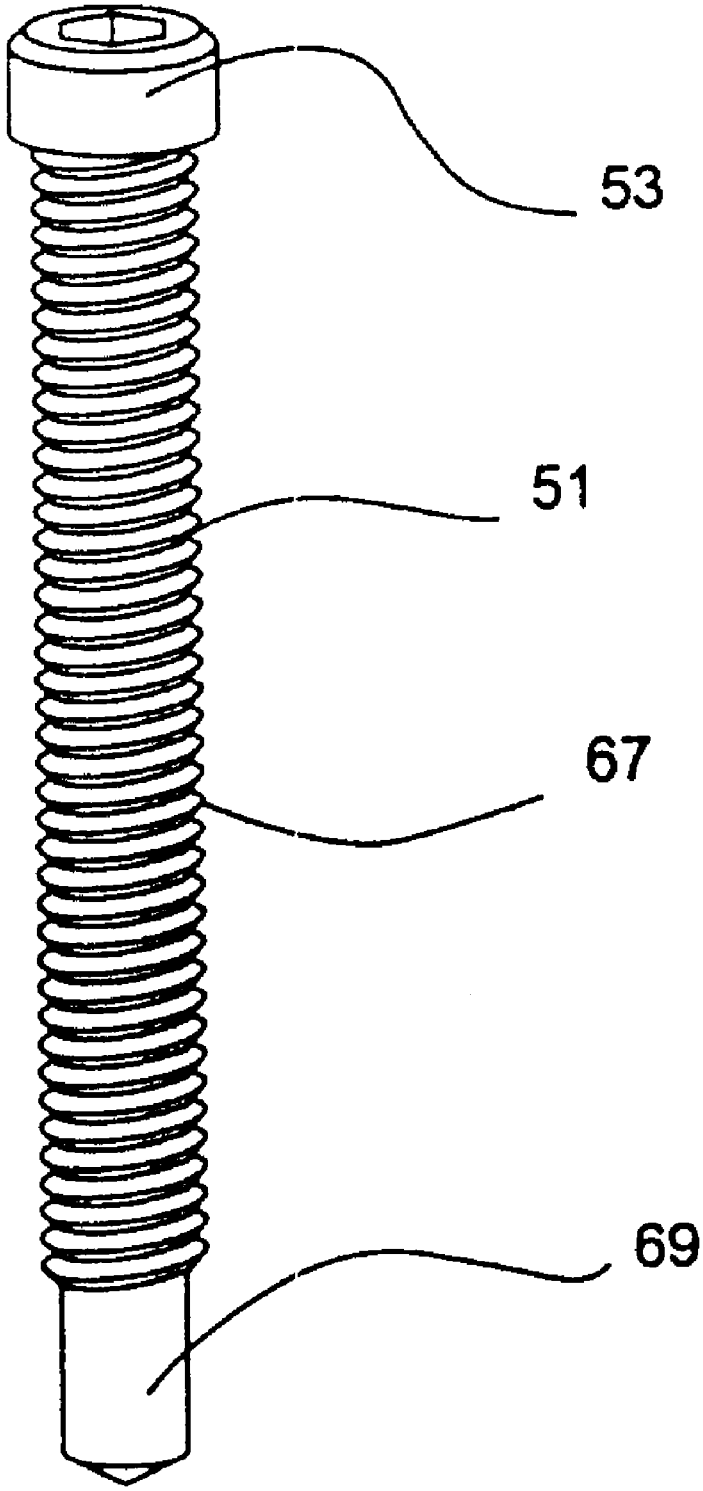
FIG. 8 is a side view of the jack screw of the locking system.

The jackscrew is shown in FIG. 8. Screw 51 has a head 53 which provides a point of engagement. The head may include a lever or thumb screw (not shown) but the preferred method employs a hex key wrench engaging in a hex head. The screw which ends in an unthreaded end 69, carries threads over 67 most of its length.

Figure 9A:
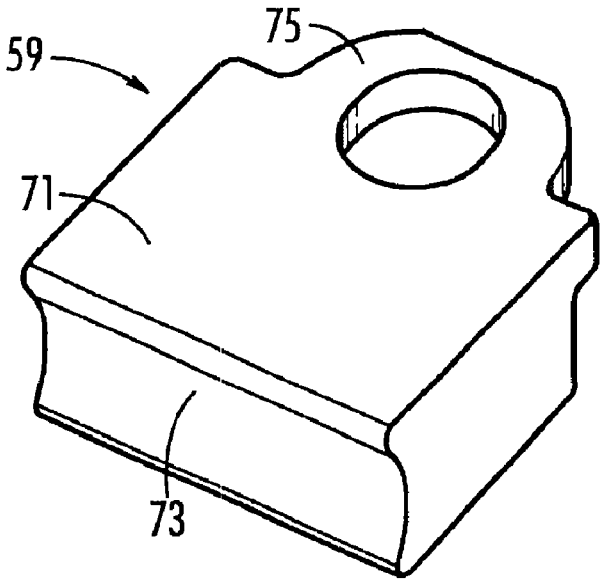
FIGS. 9A and 9B are perspective views of the brake shoe of the locking device.
Figure 9B:
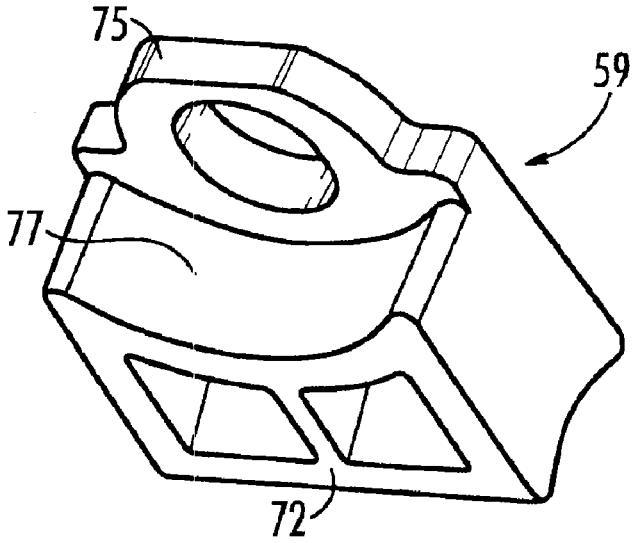

The brake shoe 59 is shown in top perspective in FIG. 9A and in bottom perspective in FIG. 9B. The brake shoe has a top surface 71, a bottom surface 72. On the side facing the hinge pin, a curved contact surface 73 is formed to engage the housing 60. On the side facing the cam, a cam follower face 77 engages the cam lobe 63. Locating fork 75 rests on the top of the cam lobe and surrounds the unthreaded end of screw 51 to align the brake with the cam and hinge.

In operation, when the screen height has been set, the jackscrew is turned to urge the cam into the brake which presses against the housing 60 around hinge pin 21 to release the lock mechanism. To release, it is required only to back the jackscrew off less than half of a turn.

Figure 10:
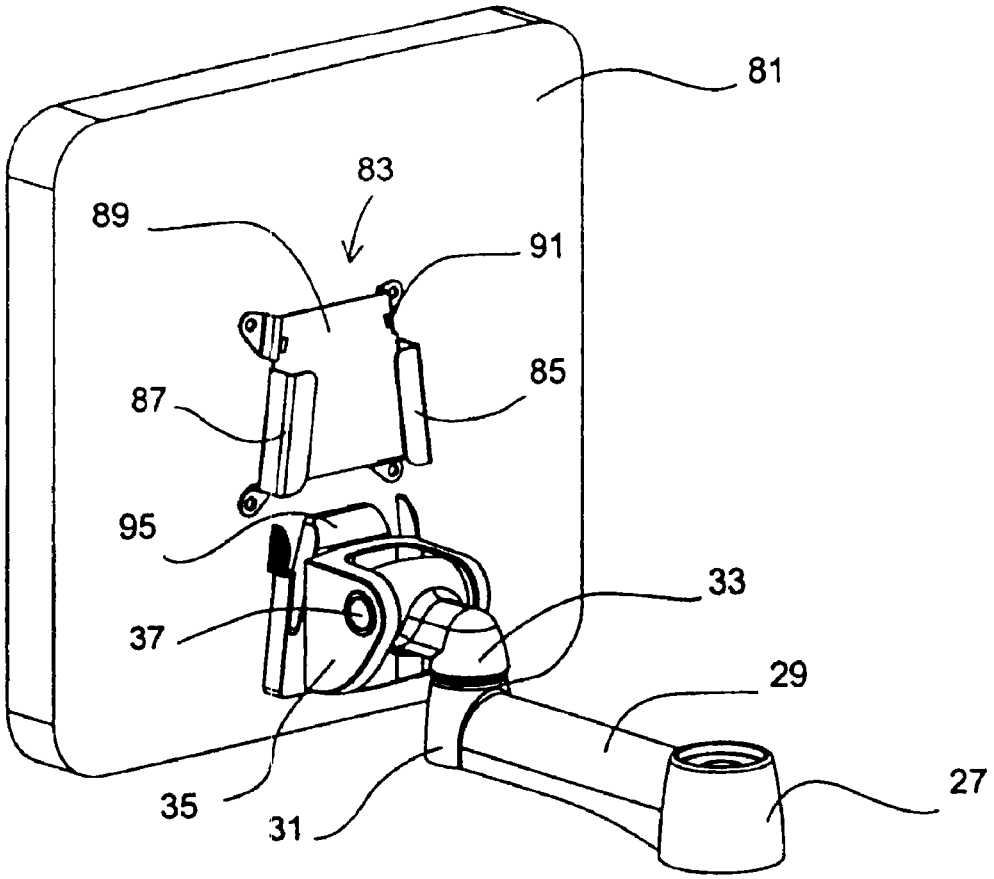
FIG. 10 is a perspective view of the quick change mounting system.

Rapid screen changes are available due to the quick change mounting system. The concept is shown in FIG. 10. Flat screen 81 has threaded receptacles 83 to which the trapezoidal surface plate 89 attaches with machine screws or equivalent fastening means.

Figure 11:
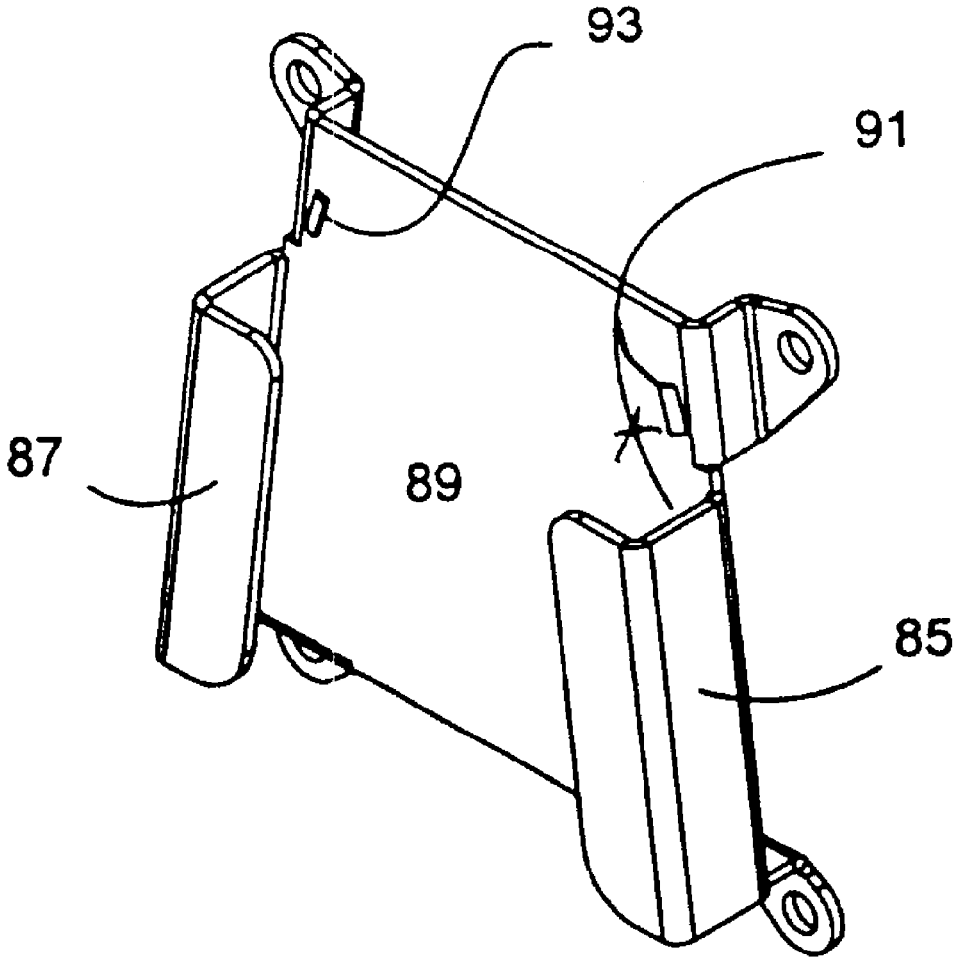
FIG. 11 is a perspective view of the monitor mounting bracket.

As shown in FIG. 11, each side of the surface plate are channels 85, 87 disposed at an angle to the vertical such that the distance between the channels is greater at the base of the surface plate than at the top of the channels. At or near the top of each channel and disposed inwardly of the channel are protuberance 91, 93 from the surface plate. The protuberance needs only be a small fraction of the depth of the channels. Their function will be discussed below.

Figure 12A:
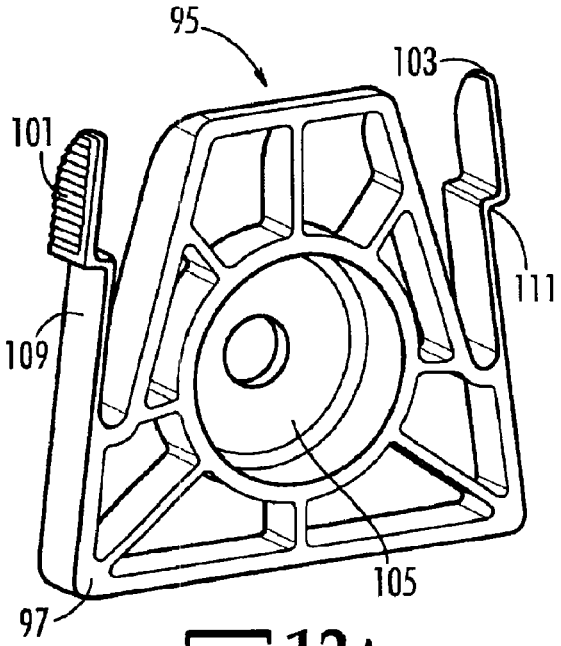
FIGS. 12A and 12B are a perspective view of the quick change swivel plate.
Figure 12B:
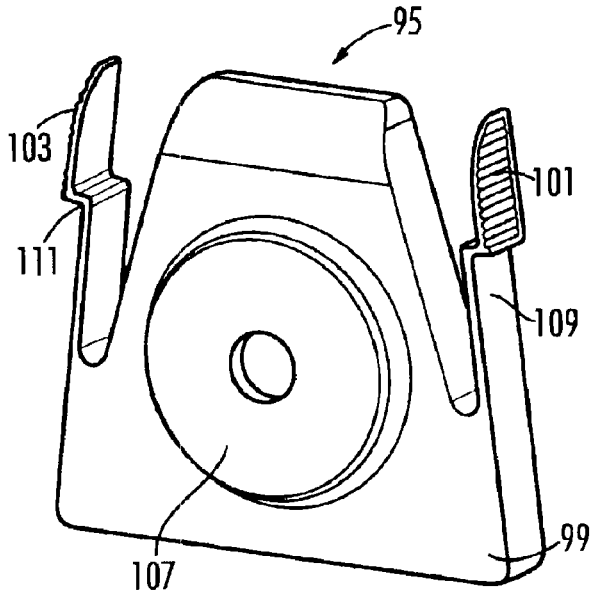

The swivel plate 95 is illustrated in FIGS. 12A and 12B. Obverse face 97 has cantilevered locking tabs 101, 103 projecting vertically on each side. The plate is trapezoidally shaped to conform to the surface of plate 87 with the tabs 101,103 sized to fit into channels 85, 87 respectively. The tabs are flexible over about one half of their upper portion. Countersunk area 105 allows a fastener to be used to secure the plate to bracket 35 without the fastener projecting past the surface of the face 97. FIG. 12B shows the reverse face 99. A pedestal area 107 conforms to the shape of countersunk area 105 and allows for a space between face 99 and bracket 35.

Reverting to FIG. 10, it may be seen that the screen is lowered so that the swivel plate 95 slide into bracket 83. Tabs 101, 103 fit into channels 85, 87. When the tabs and channel fully conform, the ends of the tabs project slightly above the channels. When present, notches 109, 111 resist withdrawing the swivel plate from the mounting bracket. To effect removal, the tabs are drawn together, sliding across aforementioned protuberances 91, 93 so as to hold the ends of the tabs away from contact with the top of the channels. The screen can then be lifted off of the mount and a new screen installed in two motions. With the tabs held inwardly by the protuberances, both hands may be used to hold and manipulate the screen.

INDUSTRIAL APPLICABILITY

The structures of this invention are useful in the petrochemical industry for monitoring the condition of process equipment, in the distribution of products to determine, for example, availability status, in the transportation industry for viewing shipping information, departure schedules and service schedules, in the brokerage industry for displaying information relating to commodities and securities. The apparatus may also be used in the entertainment industry when a large picture is formed as a mosaic on a number of adjacent display screens.

Changes and departures in this invention may be made by those skilled in the art without departing from the spirit and scope thereof. Therefore the invention is not intended to be limited by the description and figures but are those as set forth in the following claims.

I claim:

[1. A mounting system for at least one display device comprising:

a support hub;

a first socket projecting from said support hub;

a turret mounted on said first socket having hinging means to connect to a first end of a radius arm and a first end of a control arm;

a second socket with hinging means to connect to a second end of said radius arm and to a second end of a control arm;

a second turret mounted in said second socket;

a fixed length arm extending away from said second turret;

a third socket attached to an end of said fixed length arm away from said second turret;

a swivel arm rotatably mounted in said third socket; and a mounting bracket for a display device hingedly attached to said swivel arm.]

[2. A mounting system according to claim 1 supporting more than one mounting bracket using more than one first socket.]

3. A mounting system [according to claim 1] *for at least one display device comprising:*

*a support hub;*

*a first socket projecting from said support hub;*

*a turret mounted on said first socket having hinging means to connect to a first end of a radius arm and a first end of a control arm;*

*a second socket with hinging means to connect to a second end of said radius arm and to a second end of a control arm;*

*a second turret mounted in said second socket;*

*a fixed length arm extending away from said second turret;*

*a third socket attached to an end of said fixed length arm away from said second turret;*

*a swivel arm rotatably mounted in said third socket; and*

*a mounting bracket for a display device hingedly attached to said swivel arm* further comprising a means to lock the height of the mounting bracket.

4. A mounting system [according to claim 1] *for at least one display device comprising:*

*a support hub;*

*a first socket projecting from said support hub;*

*a turret mounted on said first socket having hinging means to connect to a first end of a radius arm and a first end of a control arm;*

*a second socket with hinging means to connect to a second end of said radius arm and to a second end of a control arm;*

*a second turret mounted in said second socket;*

*a fixed length arm extending away from said second turret;*

*a third socket attached to an end of said fixed length arm away from said second turret;*

*a swivel arm rotatably mounted in said third socket; and*

*a mounting bracket for a display device hingedly attached to said swivel arm* further comprising a bayonet system enabling a quick change method for changing display devices.

*5. A mounting system for at least one display device comprising:*

*a support hub;*

*a first socket projecting from said support hub;*

*a first turret mounted on said first socket having hinging means to connect to a first end of a first radius arm and a first end of a first control arm;*

*a second socket with hinging means to connect to a second end of said first radius arm and to a second end of said first control arm;*

*a second turret mounted in said second socket;*

*a first fixed length arm extending away from said second turret;*

*a third socket attached to an end of said first fixed length arm away from said second turret;*

*a first swivel arm rotatably mounted in said third socket; and*

*a first mounting bracket for a first display device hingedly attached to said first swivel arm;*

*a fourth socket projecting from said support hub;*

*a third turret mounted on said fourth socket having hinging means to connect to a first end of a second radius arm and a first end of a second control arm;*

*a fifth socket with hinging means to connect to a second end of said second radius arm and to a second end of said second control arm;*

*a fourth turret mounted in said fifth socket;*

*a second fixed length arm extending away from said fourth turret;*

*a sixth socket attached to an end of said second fixed length arm away from said fifth turret;*

*a second swivel arm rotatably mounted in said sixth socket; and*

*a second mounting bracket for a second display device hingedly attached to said second swivel arm;*

*a seventh socket projecting from said support hub;*

*a fifth turret mounted on said seventh socket having hinging means to connect to a first end of a third radius arm and a first end of a third control arm;*

*an eighth socket with hinging means to connect to a second end of said third radius arm and to a second end of said third control arm;*

*a sixth turret mounted in said eighth socket;*

*a third fixed length arm extending away from said sixth turret;*

*a ninth socket attached to an end of said third fixed length arm away from said sixth turret;*

*a third swivel arm rotatably mounted in said ninth socket; and*

*a third mounting bracket for a third display device hingedly attached to said third swivel arm;*

*a tenth socket projecting from said support hub;*

*a seventh turret mounted on said tenth socket having hinging means to connect to a first end of a fourth radius arm and a first end of a fourth control arm;*

*an eleventh socket with hinging means to connect to a second end of said fourth radius arm and to a second end of said fourth control arm;*

*an eighth turret mounted in said eleventh socket;*

*a fourth fixed length arm extending away from said eighth turret;*

*a twelfth socket attached to an end of said fourth fixed length arm away from eighth turret;*

*a fourth swivel arm rotatably mounted in said twelfth socket; and*

*a fourth mounting bracket for a fourth display device hingedly attached to said fourth swivel arm.*

*6. The mounting system of claim 5 further comprising a connector.*

*7. The mounting system of claim 6 further comprising a second hub attached to said connector.*

*8. A mounting system for at least one display device comprising:*

*a first support hub;*

*a first socket projecting from said first support hub;*

*a first turret mounted on said first socket having hinging means to connect to a first end of a first radius arm and a first end of a first control arm;*

*a second socket with hinging means to connect to a second end of said first radius arm and to a second end of said first control arm;*

*a second turret mounted in said second socket;*

*a first fixed length arm extending away from said second turret;*

*a third socket attached to an end of said first fixed length arm away from said second turret;*

*a first swivel arm rotatably mounted in said third socket;*

*a first mounting bracket for a first display device hingedly attached to said first swivel arm;*

*a fourth socket projecting from a second support hub;*

*a third turret mounted on said fourth socket having hinging means to connect to a first end of a second radius arm and a first end of a second control arm;*

*a fifth socket with hinging means to connect to a second end of said second radius arm and to a second end of said second control arm;*

*a fourth turret mounted in said fifth socket;*

*a second fixed length arm extending away from said fourth turret;*

*a sixth socket attached to an end of said second fixed length arm away from said fifth turret;*

*a second swivel arm rotatably mounted in said sixth socket;*

*a second mounting bracket for a second display device hingedly attached to said second swivel arm; and*

*a connector between said first support hub and said second support hub.*

*9. A mounting system for at least one display device of claim 8 further comprising:*

*a seventh socket projecting from said first support hub;*

*a fifth turret mounted on said seventh socket having hinging means to connect to a first end of a third radius arm and a first end of a third control arm;*

*an eighth socket with hinging means to connect to a second end of said third radius arm and to a second end of said third control arm;*

*a sixth turret mounted in said eighth socket;*

*a third fixed length arm extending away from said sixth turret;*

*a ninth socket attached to an end of said third fixed length arm away from said sixth turret;*

*a third swivel arm rotatably mounted in said ninth socket; and*

*a third mounting bracket for a third display device hingedly attached to said third swivel arm.*

*10. A mounting system for at least one display device of claim 9 further comprising:*

*a tenth socket projecting from said second support hub;*

*a seventh turret mounted on said tenth socket having hinging means to connect to a first end of a fourth radius arm and a first end of a fourth control arm;*

*an eleventh socket with hinging means to connect to a second end of said fourth radius arm and to a second end of said fourth control arm;*

*an eighth turret mounted in said eleventh socket;*

*a fourth fixed length arm extending away from said eighth turret;*

*a twelfth socket attached to an end of said fourth fixed length arm away from eighth turret;*

*a fourth swivel arm rotatably mounted in said twelfth socket; and*

*a fourth mounting bracket for a fourth display device hingedly attached to said fourth swivel arm.*

* * * * *